US008156245B2

(12) United States Patent
Knudsen et al.

(10) Patent No.: US 8,156,245 B2
(45) Date of Patent: *Apr. 10, 2012

(54) METHOD AND SYSTEM FOR VERIFYING MODEM STATUS

(75) Inventors: Joseph J. Knudsen, Hugo, MN (US); Kory Lasker, Minneapolis, MN (US)

(73) Assignee: Qwest Communications International Inc., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 12/842,178

(22) Filed: Jul. 23, 2010

(65) Prior Publication Data

US 2010/0306375 A1    Dec. 2, 2010

Related U.S. Application Data

(63) Continuation of application No. 10/960,875, filed on Oct. 6, 2004, now Pat. No. 7,792,937, which is a continuation of application No. 09/649,864, filed on Aug. 28, 2000, now Pat. No. 6,947,980.

(51) Int. Cl.
*G06F 15/16* (2006.01)
*G06F 15/173* (2006.01)

(52) U.S. Cl. ......... 709/238; 709/202; 709/203; 709/239

(58) Field of Classification Search .................. 709/202, 709/203, 238, 239
See application file for complete search history.

(56) References Cited

U.S. PATENT DOCUMENTS

| | | | |
|---|---|---|---|
| 6,137,839 A | 10/2000 | Mannering et al. | |
| 6,161,201 A | 12/2000 | Payne et al. | |
| 6,185,624 B1 | 2/2001 | Fijolek et al. | |
| 6,215,863 B1 | 4/2001 | Bennett et al. | |
| 6,272,150 B1 * | 8/2001 | Hrastar et al. | 370/486 |
| 6,292,481 B1 | 9/2001 | Voit et al. | |
| 6,374,102 B1 | 4/2002 | Brachman et al. | |
| 6,389,127 B1 * | 5/2002 | Vardi et al. | 379/209.01 |
| 6,430,275 B1 | 8/2002 | Voit et al. | |
| 6,459,702 B1 | 10/2002 | Saaverda et al. | |
| 6,463,552 B1 | 10/2002 | Jibbe | |
| 6,480,748 B1 | 11/2002 | Gerszberg et al. | |
| 6,501,849 B1 | 12/2002 | Gupta et al. | |
| 6,516,056 B1 | 2/2003 | Justice et al. | |
| 6,522,668 B1 | 2/2003 | Singleton et al. | |
| 6,529,743 B1 | 3/2003 | Thompson et al. | |
| 6,538,998 B1 | 3/2003 | Garimella | |
| 6,580,727 B1 | 6/2003 | Yim et al. | |

(Continued)

OTHER PUBLICATIONS

"Midrange Systems: SCSI modem (Central Data Corp's scsiModem Server) (Product Announcement)(Brief Article):" Jan. 12, 1996.

(Continued)

*Primary Examiner* — Hieu Hoang

(57) ABSTRACT

A system for verifying modem status for a telecommunications service provider in a broadband network serviced by a central office. The system comprising an interne interface for receiving a modem status request from the telecommunications service provider via a telecommunications network and an integrator capable of retrieving subscriber information and a server connected to the internet interface for receiving the modem status request and transmitting the modem status request to the integrator. The integrator interprets the modem status request and retrieves corresponding subscriber information and transmits the corresponding subscriber information to the server, the server thereby converting the corresponding subscriber information to a central office request and sending the central office request to the central office. The central office responding to the request and transmitting a status signal to the server and the server transmitting the signal to the interne interface which converts the status signal to a readable format for the telecommunications service provider.

10 Claims, 4 Drawing Sheets

U.S. PATENT DOCUMENTS

| | | |
|---|---|---|
| 6,631,184 B1 | 10/2003 | Weiner |
| 6,631,407 B1 | 10/2003 | Mukaiyama et al. |
| 6,651,190 B1 | 11/2003 | Worley et al. |
| 6,690,720 B1 | 2/2004 | Downey |
| 6,732,188 B1 | 5/2004 | Flockhart et al. |
| 6,795,699 B1 | 9/2004 | McCraw et al. |
| 6,836,476 B1 | 12/2004 | Dunn et al. |
| 6,947,980 B1 | 9/2005 | Knudsen et al. |
| 6,963,916 B1 | 11/2005 | Pugaczewski et al. |
| 6,973,044 B1 | 12/2005 | Barach |
| 7,792,937 B2 | 9/2010 | Knudsen et al. |
| 2001/0039573 A1 | 11/2001 | Collin et al. |
| 2002/0004798 A1 | 1/2002 | Babula et al. |
| 2002/0021702 A1 | 2/2002 | Park |
| 2002/0054631 A1 | 5/2002 | Kim |
| 2003/0208614 A1 | 11/2003 | Wilkes |
| 2003/0208758 A1 | 11/2003 | Schein et al. |
| 2007/0118851 A1 | 5/2007 | Yun |
| 2008/0057957 A1 | 3/2008 | Altbaum et al. |

OTHER PUBLICATIONS

Wikipedia. Web Service. p. 1-6. Mar. 2008.
U.S. Appl. No. 09/649,864, Office Action dated Feb. 4, 2004, 17 pages.
U.S. Appl. No. 09/649,864, Final Rejection dated – May 18, 2004, 15 pages.
U.S. Appl. No. 09/649,864, Advisory Action dated Aug. 18, 2004, 4 pages.
U.S. Appl. No. 09/649,864, Notice of Allowance dated May 12, 2005, 5 pages.
U.S. Appl. No. 10/960,875, Office Action dated Nov. 20, 2007, 17 pages.
U.S. Appl. No. 10/960,875, Final Rejection dated Apr. 1, 2008, 19 pages.
U.S. Appl. No. 10/960,875, Advisory Action dated Jun. 11, 2008, 3 pages.
U.S. Appl. No. 10/960,875, Office Action dated Sep. 15, 2008, 4 pages.
U.S. Appl. No. 10/960,875, Final Rejection dated Feb. 27, 2009, 18 pages.
U.S. Appl. No. 10/960,875, Advisory Action dated Mar. 24, 2009, 4 pages.
U.S. Appl. No. 10/960,875, Office Action dated Jun. 26, 2009, 15 pages.
U.S. Appl. No. 10/960,875, Final Rejection dated Dec. 7, 2009, 15 pages.
U.S. Appl. No. 10/960,875, Advisory Action dated Feb. 22, 2010, 4 pages.
U.S. Appl. No. 10/960,875, Notice of Allowance, dated May 18, 2010, 11 pages.

* cited by examiner

| Name | Phone | |
|---|---|---|
| DAENZER, BARBARA | 6128240534 | — 34 |
| KILLION, KYLE | 612 790-2293 CBR 612 | |
| AARON FLORIN | 612-333-0774 EXT., AARON | |
| JEFF OWENS | 612-930-1060 EXT., JEFF | |
| E J LINCK | 612-379-3805 EXT. 107, | |
| TERRY BYRNES | 612-890-8196 EXT., TERRY | |
| M S GJETSON | 651-488-7852 | |
| KEVIN CALLINAN | 651-774-4593 EXT., KEVIN | |
| TIM ZAPPIA | 612-937-4422 EXT., TIM | |
| DENNIS LOUDEN | 651-698-8559 EXT., DENNIS | |
| MASON, EUGENE | 6516984782  6513785137 | |

36 (left label for TIM ZAPPIA row); 38 (bottom right)

FIG. 3

METHOD AND SYSTEM FOR VERIFYING MODEM STATUS

CROSS REFERENCE TO RELATED APPLICATIONS

This application is a continuation of U.S. patent application Ser. No. 10/960,875 entitled "METHOD AND SYSTEM FOR VERIFYING MODEM STATUS" filed Oct. 6, 2004, which is a continuation of U.S. application Ser. No. 09/649,864, entitled "METHOD AND SYSTEM FOR VERIFYING MODEM STATUS" filed Aug. 28, 2000, now U.S. Pat. No. 6,947,980; the entirety of each of the aforementioned applications is incorporated herein by reference for all purposes.

TECHNICAL FIELD

This invention relates to a method and system for verifying modem status for a telecommunication system and more particularly to verifying modem status in real-time of an internet subscriber service.

BACKGROUND ART

Digital Subscriber Line signal architectures, generally denoted as DSL, provide simultaneous voice and high-speed data services over a signal copper wire pair. DSL allows data transmission at speeds much faster than the best available analog modems. There exist several variations of DSL systems that use copper wire cabling to move data between the site and the serving central office. Data, voice and video are separated at the serving central office. Voice is delivered to the public switched telephone network while data is delivered to the host destination over high speed service access links.

As and example, ADSL or Asymmetric Digital Subscriber Line services generally use existing unshielded twisted pair (UTP) copper wires from a telephone company's central office to the subscriber's premise, utilize electronic equipment in the form of ADSL modems at both the central office and the subscriber's premise, send high-speed digital signals up and down those copper wires, and send more information one way than the other. The ADSL type of DSL services is capable of providing a downstream bandwidth of approximately 1.5 Mbps-8 Mbps, and upstream bandwidth of about 16 Kbps-64 Kbps with loop distances ranging from about 3.7 km-5.5 km. DSL or High bit rate Digital Subscriber Line services provide a symmetric, high performance connection over a shorter loop, and typically require two or three copper twisted pairs. DSL is capable of providing both upstream and downstream bandwidth of approximately 1.5 Mbps, over loop distances of up to approximately 3.7 km. DSL or single line digital services provide a symmetric connection that matches DSL performance using a single twisted pair, but operating over a shorter loop of up to approximately 3.0 km.

DSL services are typically implemented in an asymmetric form having a downstream transmission capability of approximately 52 Mbps over twisted pair copper wire arranged in local loops of 300 m, 26 Mbps at 1,000 m, and 13 Mbps at 1,500 m. Upstream data rates in asymmetric implementations tend to range from approximately 1.6 Mbps to approximately 2.3 Mbps. As though skill in the art will recognize, a typical distribution system includes a central office equipped with a Host Digital Terminal (HOT) and arranged to operate as a hub between multiple Video Information Providers (VIPs)/Digital Service Providers (DIPS) and customer residential dwellings. In a Fiber-To-The-Neighborhood (FTN) type distribution system, optic fiber (e.g. OC-3c and OC-12c) lines are used to connect the central office to a Universal System Access Multiplexer (USAM), which is then connected to a Network Interface Device (NID) located on the customer property via twisted pair copper wire. A dedicated DSL loop extends between the NID and an individual customer residence using an existing POTS or telephone system twisted pair wire, and a customer interface device, such as a residential gateway or set top box, provides a connection point for a customer display device such as a television or personal computer. A Fiber-To-The-Curb (FTTC) type distribution system is similar except that a Broadband Network Unit (BNU) is used in place of the USAM, and coaxial cable is used to connect the BNU, MD, and set top box.

The DSL signal format is used to carry signals to and from the customer. In these systems, the central office provisions each user for programming access rights, and maintains a profile database for each provisioned customer at the HOT to control the signals/channels that can be viewed by the customer.

The improvements in DSL technology are reducing access costs and increasing DSL subscribers. Improvements in access speed and ease of use are making DSL attractive for home, small business and some large business users. Full time access or connectivity has reduced call set-up time delay and eliminates getting "bumped" off the network. DSL speeds may vary from part time 256 Kps speeds to 7 Mbps downstream/upstream for intensive business users. Further improvements in DSL's is allowing high-speed digital communications connections on voice lines. Subscribers have the ability to continue making voice calls while transmitting data, receiving files or working on the Internet.

Due to the improvements noted, more and more subscribers are connecting to the Internet via DSL connections. It has become important for Internet Service Providers (ISP's) to provide better and faster service. As the ISP is the connection from the subscriber to the Internet, the subscriber is reliant on the ISP for any utilization of the Internet or network related service using the DSL. The ISP service ideally wishes to limit downtime due to faulty connections to a minimum. Currently, the ISP is blind to a subscriber's connection status. If a connection issue occurs for any reason, the customer is dependent upon the ISP to assist in troubleshooting the connection. The ISP initially may trouble shoot at the ISP end but is often required to phone the DSL service and request status. This phone request is very time consuming for the ISP as well as for the DSL service provider. Further, multiple requests for status are often difficult to satisfy for the DSL provider. In some circumstances real time responses are very difficult due to numerous status requests from multiple ISP's.

New subscriber connection status is as important as current subscriber connection status. New subscribers often have multiple hardware and software related concerns that must be addressed for proper DSL connections status. Having an accurate real-time status of the DSL connection is very useful in new subscriber connection troubleshooting. Consequently, a need has developed for a method and system for verifying modem status.

DISCLOSURE OF INVENTION

It is the principal object of the present invention to provide a method and system for verifying modem connection via an internet website.

It is another object of the present invention to provide an ISP with the capability to check modem status in real-time via known website interface technology.

It is still another object of the present invention to provide an ISP with the capability to troubleshoot modem connections by allowing the ISP to independently verify customer connections at the DSLAM of the respective central office.

In carrying out the above objects, there is provided a method for verifying modem status for an telecommunications service provider in a communications network serviced by a central office. The method comprises connecting to an internet interface and transmitting a modem status request to the internet interface. The modem status request is transferred from the internet interface to a server and subsequently transmitted an integrator whereby the integrator interprets the modem status request and retrieves corresponding subscriber information. The corresponding subscriber information is transferred to the server and then converted to a central office request and eventually sent to the central office. The request queries modem status of a customer and creates a status signal which is transmitted back to the server. The server transmits the status signal from the server to the internet interface and converts the status signal to a readable format for the telecommunications service provider indicating status as "trained", "not trained" or "training".

In carrying out the above method, there is provided a system that automates the above steps. The system comprises a web server having an internet website interface for receiving a modem status request from the internet service provider via the internet, an integrator capable of retrieving subscriber location information and a status server connected to the web server for receiving the modem status request and transmitting the request to the integrator whereby the integrator interprets the modem status request and retrieves corresponding subscriber location information. The integrator transmits the corresponding subscriber information to the status server and the status server thereby converts the corresponding subscriber information to a central office DSLAM request and sends the central office DSLAM request to the central office DSLAM. The central office DSLAM responds to the request and transmits a status signal to the status server and the status server transmits the signal to the webserver which converts the signal to a readable format on the internet website interface for viewing by the internet service provider.

These and other objects, features, and advantages of the present invention will become more readily apparent by reference to the following description of the drawings wherein like reference numerals correspond to like components.

BRIEF DESCRIPTION OF DRAWINGS

FIG. 3 is a representative web interface illustrating DSL subscribers; and

BEST MODE FOR CARRYING OUT THE INVENTION

Figure 1:
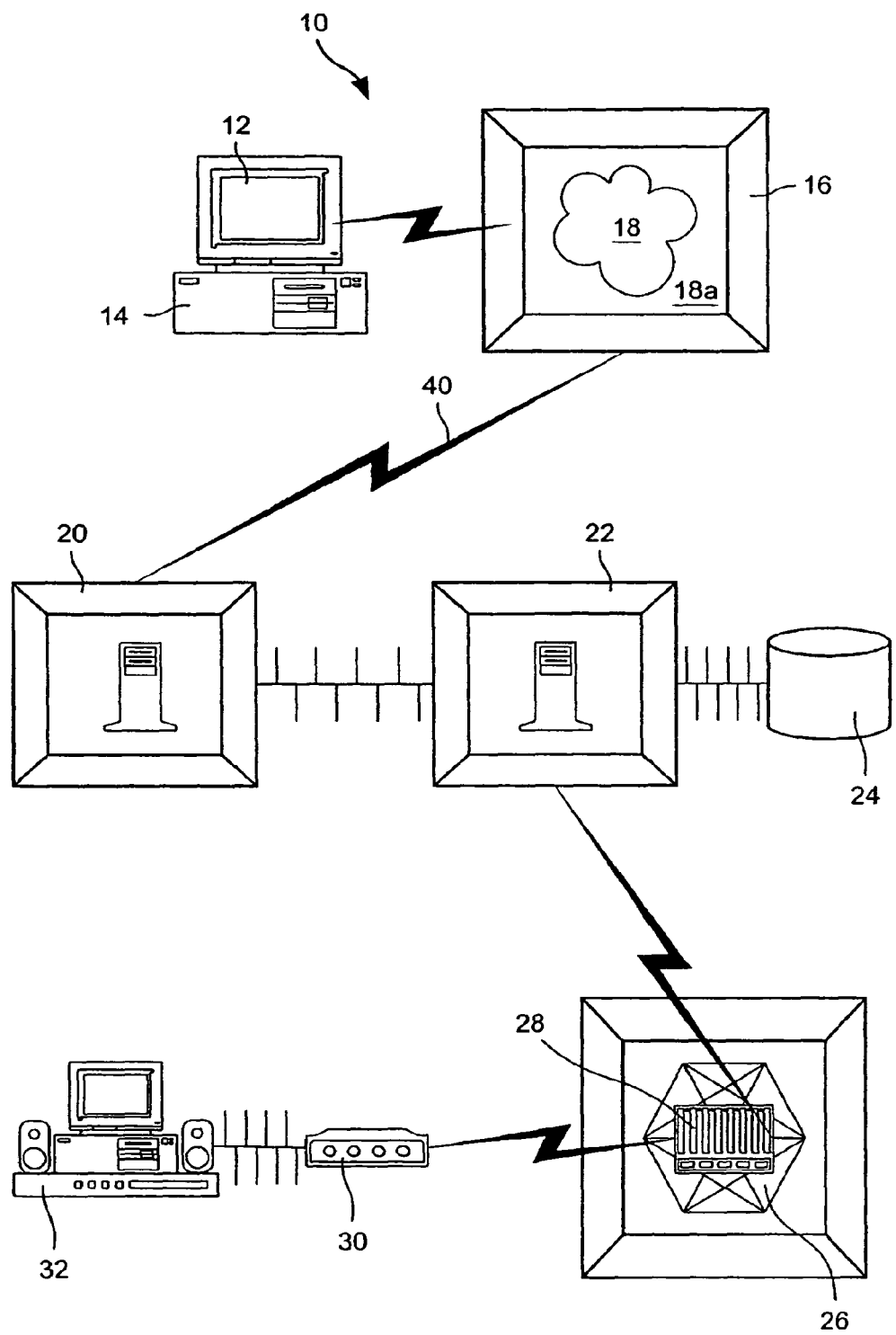
FIG. 1 is a schematic diagram of the system for verifying modem status of the present invention.

With reference to FIG. 1 of the drawings, there is shown a generalized schematic of the system 10 of the present invention. As discussed above, when an ISP 12, using a computer system 14 desires to check modem status, the ISP 12 connects to the Internet via common Internet connections methods. The ISP will connect up to the appropriate internet interface or internet web site by having the appropriate Internet addresses previously provided by the DSL service provider or by using appropriate search techniques if necessary. The interne web site 18 is resident on a web server 20. Any common web server such as the Apache Group's Apache Web Server or Microsoft IIS is envisioned for the web server 20 system component.

Web server 20 is connected and in communication with status server 22. Status server 22, in the preferred embodiment is a UNIX inetd server that is capable of listening on a UNIX socket (port 7895) on two production servers. The status server 22 is connected and in communication with a database 24. The database 24, in the preferred embodiment contains useful customer information. As shown in FIG. 1, status server 22 is capable of communicating with a DSLAM 26 at the central office 28. The DSLAM 26 is in communication with the DSL modem 30 which is connected to the ultimate customer or subscriber 32.

Figure 2:
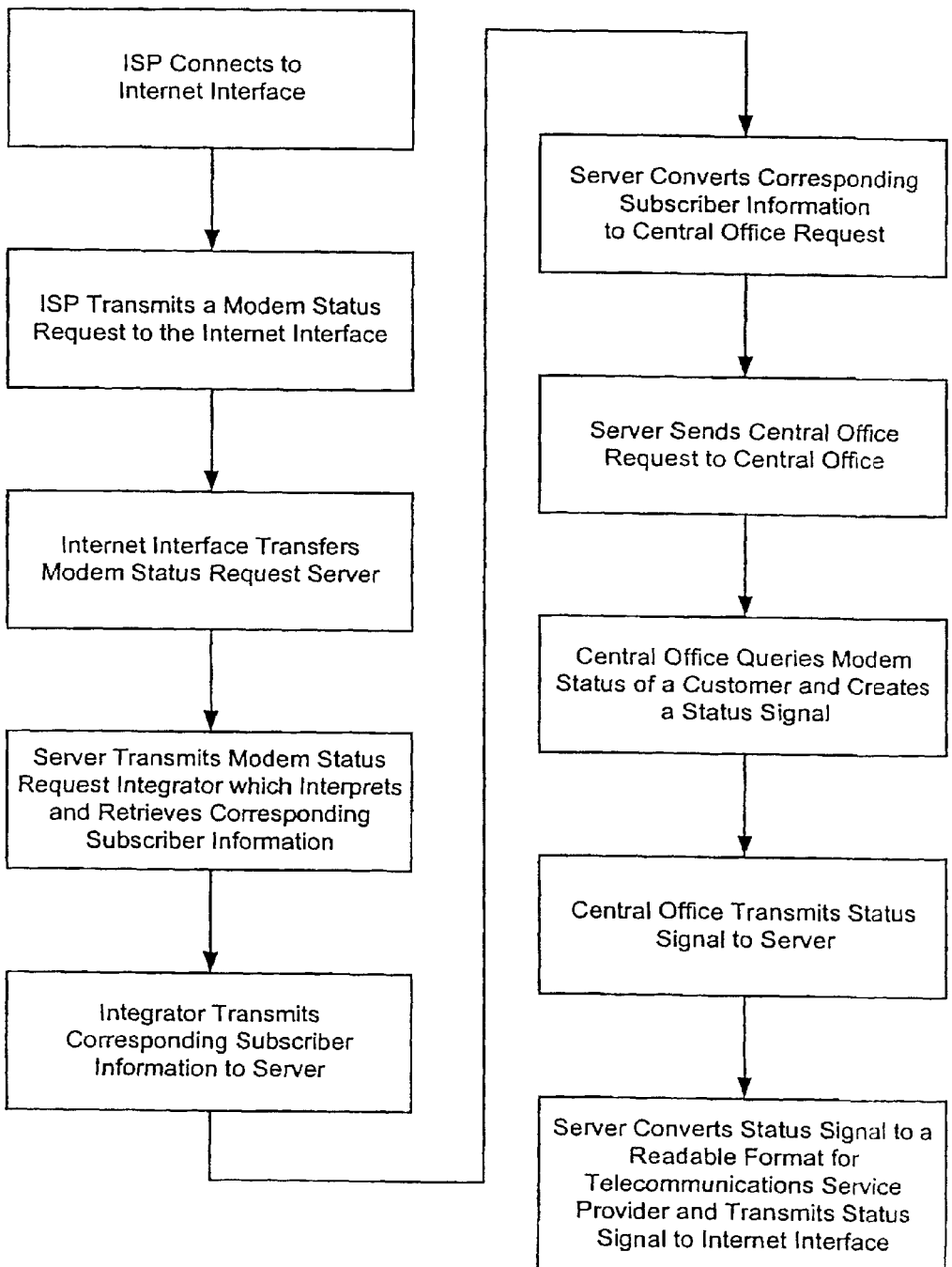
FIG. 2 is a flow diagram of the method for verifying modem status of the present invention.

In the preferred embodiment, the method as described in FIG. 2, comprises using a digital broadband network serviced by a central office 26. The ISP 12 connects to webserver 20 using having an internet website interface 18. As shown in FIG. 3, the website interface 18 includes a list 34 of telecommunications service provider customers 36. Each customer 36 has a corresponding phone number 38. In this manner the ISP can easily designate the appropriate customer 36 from the list 34. If a customer calls the ISP with trouble in connection, the ISP can begin the trouble shooting procedure by picking or designating from the list 34 the appropriate customer. In choosing the customer from the list 34, the ISP has through the use of the website interface 18 transmitted a modem status request 40 to the webserver 20 via the website interface 18.

The webserver 20 transfers the modem status request 40 from the webserver 20 to a status server 22. As discussed above, the status server, in the preferred embodiment is a UNIX inetd server. The status server 22 handles multiple simultaneous requests in real time. The modem status request 40, now in the form of a telephone number 38 is transmitted from the status server 22 to an integrator 24. The status server does what is known in the art as SQL to the integrator 24. The integrator 24 interprets the modem status request 40 in the form of phone number 38 and retrieves corresponding subscriber location information 42. This subscriber location information 42 may be in the form of customer node and port records for which the DSLAM 28 the customer 12 is provisioned on. The integrator 24 transits the customer node and port records or corresponding subscriber location information 42 to the status server 22.

The status server converts the corresponding subscriber location information 42 to a central office DSLAM request 44. In the art, the central office DSLAM request 44 is also known as a SNMP request. This central office DLSAM request 44 is sent to the corresponding central office DSLAM 28. This request queries the modem status of a customer the DSLAM creates a status signal. This status signal 46 is related to the status of the modem and is "connected", "not connected" or "connecting" or also known as "trained", "not trained" or "training". Status signal 46 is transmitted to status server 22. Status server 22 transits the status signal 46 from the status server 46 to the web server 20 all in real time.

Figure 4:
FIG. 4 is a representative web interface illustrating modem status.

The webserver 20 converts the status signal 46 to a website interface 18a, as shown in FIG. 4 which is in a readable format. More specifically, the status of "trained", "not trained" or "training" is viewable in a graphical and textual format which is easily readable by the ISP. This real time information greatly enhances the ISP trouble shooting and set-up capabilities for use with the customer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   providing an internet interface to determine a Digital Subscriber Line (DSL) modem status for each of a plurality of customers of an Internet Service Provider (ISP);
   receiving, at the internet interface, a first modem status request to check a status of a modem associated with a first one of the customers, the first modem status request comprising a subscriber identifier;
   retrieving subscriber location information based on the subscriber identifier, the subscriber location information comprising port information, indicating a Digital Subscriber Line Access Multiplexer (DSLAM) provisioning the modem;
   transmitting a second modem status request to the DSLAM; and
   receiving a status signal from the DSLAM indicating one of a connected status, a not connected status, and a connecting status.

2. The method of claim 1, further comprising converting the status signal to a readable format.

3. The method of claim 1, wherein the second modem status request comprises an SNMP request.

4. The method of claim 1, wherein the internet interface is a website interface.

5. The method of claim 1, further comprising:
   displaying a list of one or more customer names, each customer name associated with a phone number;
   wherein receiving the first request to check the status of the modem comprises receiving a selection of one or more customer names on the list.

6. A system comprising:
   an internet interface for receiving a first modem status request to check a status of a modem associated with a customer of an Internet Service Provider (ISP) the first modem status request comprising a subscriber identifier;
   a server to transmit a second modem status request to a central office of a telecommunications provider associated with the modem and to receive, from the central office, a status signal indicating the status of the modem and including one of a connected status, a non-connected status, and a connecting status; and
   an integrator storing subscriber location information, wherein the server is further configured to obtain, from the integrator, the subscriber location information based on the subscriber identifier, the subscriber location information comprising port information, and to use the subscriber location information to determine the central office associated with the modem.

7. The system of claim 6, wherein the internet interface further converts the status signal to a readable format.

8. The system of claim 6, wherein the second modem status request comprises an SNMP request.

9. The system of claim 6, wherein the internet interface is a website interface.

10. The system of claim 6, wherein the internet interface displays a list of one or more customer names, each customer name associated with a phone number, and wherein receiving the first request to check the status of the modem comprises receiving a selection of one or more customer names on the list.

* * * * *